US008851376B2

(12) United States Patent
Haas et al.

(10) Patent No.: US 8,851,376 B2
(45) Date of Patent: Oct. 7, 2014

(54) METHOD AND SYSTEM FOR PROTECTING PRIVACY OF SIGNATURES ON MAIL BALLOTS

(75) Inventors: Bertrand Haas, New Haven, CT (US); Jay Reichelsheimer, Shelton, CT (US)

(73) Assignee: Pitney Bowes Inc., Stamford, CT (US)

( * ) Notice: Subject to any disclaimer, the term of this patent is extended or adjusted under 35 U.S.C. 154(b) by 1832 days.

(21) Appl. No.: 11/866,430

(22) Filed: Oct. 3, 2007

(65) Prior Publication Data

US 2009/0091119 A1 Apr. 9, 2009

(51) Int. Cl.
*G06K 17/00* (2006.01)
*B65D 27/30* (2006.01)

(52) U.S. Cl.
CPC ............ *B65D 27/30* (2013.01); *B42D 2035/40* (2013.01); *B42D 2035/10* (2013.01); *B42D 2035/38* (2013.01)
USPC .......................................................... 235/386

(58) Field of Classification Search
USPC ........ 235/386, 454, 468, 486, 491; 283/5, 72, 283/85, 87, 88, 89; 229/68.1, 301
See application file for complete search history.

(56) References Cited

U.S. PATENT DOCUMENTS

| | | | | | |
|---|---|---|---|---|---|
| 2,887,326 | A | * | 5/1959 | Victor | 281/3.1 |
| 3,222,086 | A | * | 12/1965 | Gosselin | 462/56 |
| 4,597,591 | A | | 7/1986 | Gendron et al. | |
| 4,760,108 | A | * | 7/1988 | Asano et al. | 524/451 |
| 4,983,817 | A | * | 1/1991 | Dolash et al. | 235/462.04 |
| 5,288,994 | A | | 2/1994 | Berson | |
| 5,294,470 | A | | 3/1994 | Ewan | |
| 5,525,798 | A | * | 6/1996 | Berson et al. | 250/271 |
| 5,755,375 | A | * | 5/1998 | Rogers | 229/70 |
| 5,811,792 | A | | 9/1998 | Verschuur et al. | |
| 6,142,380 | A | * | 11/2000 | Sansone et al. | 235/487 |
| 6,270,213 | B1 | * | 8/2001 | Sansone et al. | 347/100 |
| 6,612,494 | B1 | * | 9/2003 | Outwater | 235/462.04 |
| 7,240,835 | B2 | | 7/2007 | Brucker et al. | |
| 7,467,747 | B2 | * | 12/2008 | Haas et al. | 235/491 |
| 2005/0061866 | A1 | | 3/2005 | Ackley et al. | |
| 2006/0022059 | A1 | * | 2/2006 | Juds | 235/494 |
| 2006/0249578 | A1 | * | 11/2006 | Morales | 235/386 |
| 2007/0095908 | A1 | | 5/2007 | Haas et al. | |
| 2007/0248248 | A1 | * | 10/2007 | Brucker et al. | 382/119 |
| 2008/0121680 | A1 | | 5/2008 | Quine et al. | |
| 2008/0136162 | A1 | | 6/2008 | Haas et al. | |
| 2008/0142594 | A1 | | 6/2008 | Haas et al. | |
| 2008/0143096 | A1 | | 6/2008 | Haas et al. | |
| 2008/0156862 | A1 | | 7/2008 | Haas et al. | |
| 2009/0322070 | A1 | * | 12/2009 | Reichelsheimer et al. | 283/5 |

OTHER PUBLICATIONS

Definition of Visible, Merriam-Webster Online Dictionary, 2010, http://www.merriam-webster.com/dictionary/visible, retrieved on Sep. 1, 2010.*

* cited by examiner

*Primary Examiner* — Christopher Stanford
(74) *Attorney, Agent, or Firm* — Brian A. Lemm; Charles R. Malandra, Jr.; Steven J. Shapiro

(57) ABSTRACT

Methods and systems that provide privacy of signatures on envelopes containing ballots are provided. The envelope for returning ballots includes a removable signature stub positioned on top of a signature area. The voter signs the back of the envelope on the signature stub, thereby imprinting a signature on the signature area by transferring a material from the signature stub to the signature area, and removes the signature stub. The signature is then covered by a label that conceals the signature under normal lighting conditions. To read the signature, light having a predetermined wavelength is directed onto the label, thereby rendering the label transparent and the signature visible.

2 Claims, 6 Drawing Sheets

METHOD AND SYSTEM FOR PROTECTING PRIVACY OF SIGNATURES ON MAIL BALLOTS

FIELD OF THE INVENTION

The invention disclosed herein relates generally to voting systems, and more particularly to a method and system for protecting privacy of signatures on ballots sent through the mail.

BACKGROUND OF THE INVENTION

In democratic countries, governmental officials are chosen by the citizens in an election. Conducting an election and voting for candidates for public office in the United States can be performed in several different ways. One such way utilizes mechanical voting machines at predetermined polling places. When potential voters enter the predetermined polling place, voting personnel verify that each voter is properly registered in that voting district and that they have not already voted in that election. Thus, for a voter to cast his vote, he must go to the polling place at which he is registered, based on the voter's residence. Another method for conducting an election and voting utilizes paper ballots that are mailed to the voter. The voter marks the ballot and returns the ballot through the mail. Mailed ballots have been historically reserved for absentee voting. In the usual absentee voting process, the voter marks the ballot to cast his/her vote and then inserts the ballot in a return envelope which is typically pre-addressed to the voter registrar office in the corresponding county, town or locality in which the voter is registered. The voter typically appends his/her signature on the back of the envelope adjacent to his/her human or machine readable identification.

When the return envelope is received at the registrar's office, a voting official compares the voter signature on the envelope with the voter signature retrieved from the registration file to make a determination as to whether or not the identification information and signature are authentic and valid, and therefore the vote included in the envelope should be counted. If the identification information and signature are deemed to be authentic and valid, the identifying information and signature are separated from the sealed ballot before it is handed to the ballot counters for tabulation. In this manner, the privacy of the voter's selections is maintained and thus the ballot remains a "secret ballot."

One general problem with vote by mail envelopes is the voter's signature is in the open and exposed for all to see throughout the process for determining whether or not the vote is authentic. This leads to potential privacy issues and concerns, e.g., fraudulent usage of a voter's signature. Some jurisdictions have required that such signatures be hidden from plain sight while the envelope is en route from the voter to the registrar's office. This will protect against easy imaging of the signature, such as, for example, with a hand scanner or digital camera, for later impersonation or other fraudulent purposes, e.g., identity theft. To comply with such requirements, envelopes have been proposed that hide the signature with a flap which is removed when the envelope is received at the registrar's office. These solutions, however, require some mechanical manipulation of the envelopes, which is both expensive and increases the risk of accidental tears of the envelope, potentially leading to damage to the ballots contained in the envelopes, exposing the marked ballot before the conclusion of the authentication process (which in some states require the ballot to be counted, regardless of the outcome of the authentication process), or the ability to link the voter with his/her ballot, thereby removing the secret ballot.

Voting by mail is becoming more prevalent, apart from the usual absentee voting, and in some jurisdictions, entire elections are being conducted exclusively by mail. As voting by mail becomes more prevalent, the privacy concerns discussed above are also more prevalent. Thus, there exists a need for efficient methods and systems that can protect the privacy of signatures on ballots sent through the mail while also reducing the risk of damage to the ballots when the signatures are revealed.

SUMMARY OF THE INVENTION

The present invention alleviates the problems associated with the prior art and provides methods and systems that protect the privacy of signatures for ballots sent through the mail while also reducing the risk of damage to the ballots when the signatures are revealed.

In accordance with the present invention, the envelope for returning ballots by mail includes a signature area. A removable signature stub is positioned on top of the signature area. The side of the signature stub facing the signature area is covered with a material that absorbs light having a predetermined wavelength or wavelengths, W, that is outside of, but preferably very close to, the visible spectrum of light, e.g., infrared or ultraviolet light. The material will transfer to and adhere to the signature area when pressure is applied to the side of the signature stub that does not face the signature area. The signature stub may be, for example, carbon paper with the carbon side facing the signature area. The voter signs the signature stub, thereby imprinting a signature on the signature area by transferring the material from the signature stub to the signature area, and moves the signature stub away from the signature area.

A label, which may include an image of an indicium that evidences payment of postage for the envelope, is then provided over the voter's signature. The label is formed from a transparent substrate in which dyes of various colors make up the image on the label. The dyes utilized absorb wavelengths from the human visible spectrum, but are transparent of, i.e., transmit, light of wavelength W. Since the label will absorb light under normal lighting conditions, i.e., white light or ambient light, the image on the label will be visible under such lighting conditions and conceal the voter's signature beneath the label. Upon receipt at the registrar's office (or other official vote tallying location), light having the predetermined wavelengths can be directed onto the label, thereby rendering the image on the label transparent. The light will be absorbed where the signature was imprinted on the signature area and reflected elsewhere back through the label, resulting in the voter's signature being visible. The voter's signature can then be read for comparison with official records to perform the required signature verification to determine validity and authenticity of the ballot. Thus, while the envelope is en route from the voter to the registrar's office, the voter's signature will be concealed from plain view. Viewing of the signature does not require any mechanical manipulation of the envelope or flaps on the envelope, thereby reducing the risk of causing damage to the ballot contained therein.

Therefore, it should now be apparent that the invention substantially achieves all the above aspects and advantages. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like or corresponding parts.

DETAILED DESCRIPTION OF THE PRESENT INVENTION

Figure 1:
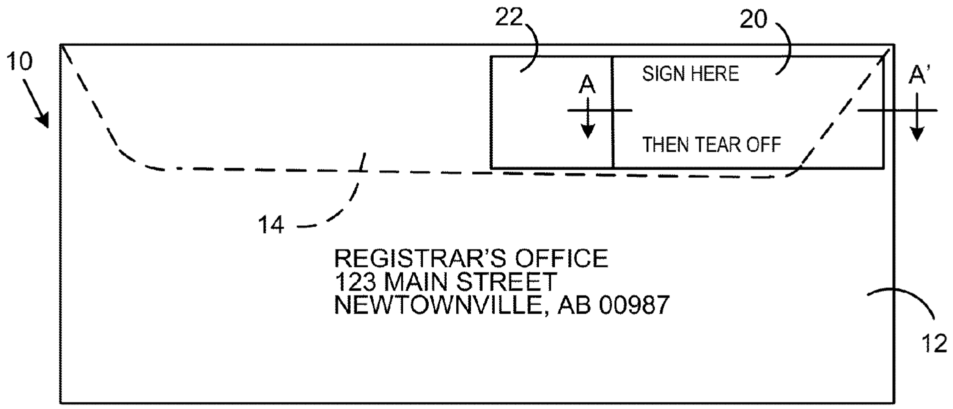
FIG. 1 illustrates an envelope, according to an embodiment of the present invention, for returning ballots by mail.

In describing the present invention, reference is made to the drawings, wherein there is seen in FIG. 1 an envelope 10 for returning ballots by mail according to an embodiment of the present invention in an open position. While the present description is directed to an envelope for returning ballots by mail, it should be understood that the invention is not so limited and the envelope 10 could be used to hold any type of communication or material. Envelope 10 includes a body portion 12 and a flap portion 14 (shown in phantom behind the body portion 12) connected to a back side of the body portion 12. When the flap portion 14 is in an open position, contents, such as, for example, a ballot, can be inserted into a pocket formed by the body portion 12. The flap portion 14 can then be moved to a closed position (as illustrated in FIG. 1), and sealed utilizing a glue or sealing strip (not shown) which when activated will adhere the flap portion 14 to the body portion 12, thereby covering the pocket and preventing the contents therein from falling out.

A front side of the body portion 12 is provided with a signature area 20 intended for the voter's signature. An area for information that identifies the voter 22 may also be provided adjacent to the signature area 20. Such information can include, for example, the voter's name and address, and is preferably provided in some machine readable form such as a barcode. The identification information is preferably printed on the body portion 12 of the envelope 10, or alternatively on an adhesive label that the voter applies to the body portion 12 adjacent to the signature area 20 in the identification area 22, using an ink that is absorptive of light having one or more wavelengths W, such as, without limitation, one or more wavelengths that fall within the infrared (IR), e.g., wavelength of greater than approximately 750 nm, and/or ultraviolet (UV), e.g., wavelength of less than approximately 400 nm, spectra. The background for the identification information is preferably reflective of light having the predetermined wavelengths W. Alternatively, the voter identification information could be printed elsewhere on the body portion 12.

Figure 2:
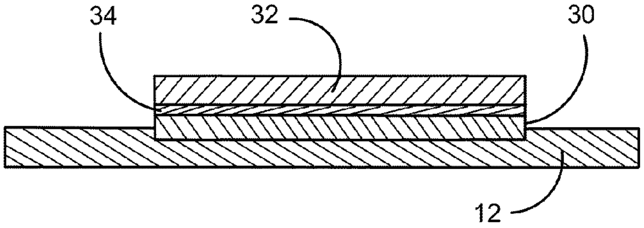
FIG. 2 illustrates a cross-sectional view of the signature area, according to an embodiment of the invention, of the envelope illustrated in FIG. 1 along line A-A'.

FIG. 2 illustrates a cross-sectional view along line A-A' in FIG. 1 of the signature area 20. Signature area 20 preferably includes a signature pad 30 that is formed from a material that is reflective to light having the predetermined wavelengths W. The signature pad 30 may be a separate material provided on a label or the like that is applied to the body portion 12, or alternatively may be formed from a material deposited directly to the body portion 12 using a suitable process, such as, for example, ink jet printing or the like. For example, for predetermined wavelengths W in the ultraviolet range, the signature pad 30 could be formed of standard optical brightener dyes deposited on the body portion 12 of the envelope 10. For predetermined wavelengths W in the infrared range, the signature pad 30 could be formed from a laser dye such as IR-125 (Indocyanine Green), IR-132 or IR-140. The use of the signature pad 30 will aid in the reading of a signature as described below. It should be noted, however, that the signature pad 30 is not required if the body portion 12 of the envelope 10 is sufficiently reflective to light having wavelengths W.

A signature stub 32 is attached to the body portion 12 of the envelope 10 preferably such that the entire signature stub 32 is within the boundary of the signature pad 30. The signature stub 32 is attached in such a manner that it can be removed completely, from the signature pad 30. Preferably, the signature stub 32 can be attached, for example, using a perforated tear strip, removable adhesive, or any other suitable means that will allow the signature stub 32 to be secured in place but easily removed when desired. The top side of the signature stub 32 that faces up away from the body portion can optionally be provided with printed instructions (as illustrated in FIG. 1) for the voter, indicating that the voter is to provide a signature in the specified area and then remove the signature stub 32. The side of the stub 32 that faces the signature pad 30 (or body portion 12) is covered with a material 34 that will absorb light of wavelengths W and will transfer to and adhere to the signature pad 30 (or body portion 12) when pressure is applied to the stub 32. For wavelengths W in the ultraviolet range and infrared range, the stub 32 and material 34 can be, for example, standard carbon paper with the carbon acting as the material 34. Carbonless copy papers or NCR (No Carbon Required) papers that utilize a microencapsulated dye and reactant to form an image can also be used provided they are selected to absorb light having the predetermined wavelengths W. The material 34 could also be formed of, for example, the following components in the following approximate quantities:

| | |
|---|---|
| Methyl Violet | 1.0% |
| Carnauba Wax | 6.0% |

-continued

| | |
|---|---|
| Montan Wax | 8.0% |
| Kaolin | 12.0% |
| Carbon Black | 15.0% |
| Mineral Oil | 25.0% |
| Paraffin Wax | 33.0% |

Figure 3:
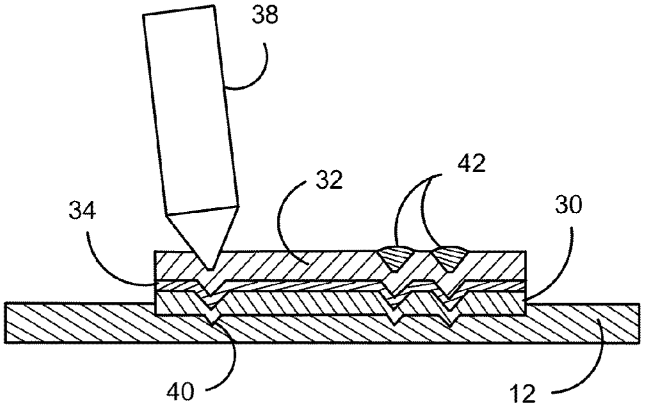
FIG. 3 illustrates the cross-sectional view of the signature area illustrated in FIG. 2 during a signature process.
Figure 4:
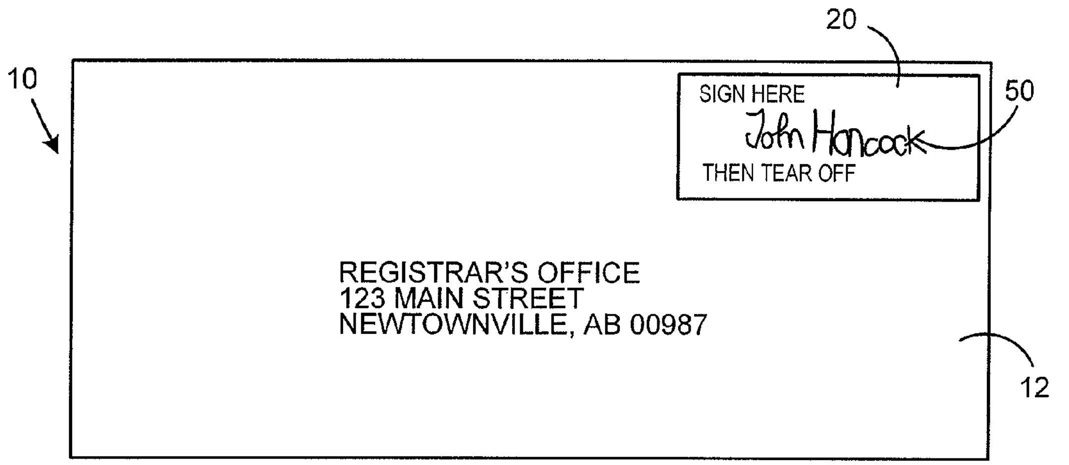
FIG. 4 illustrates the envelope of FIG. 1 during processing by a voter for return of a ballot by mail.

FIG. 3 illustrates the cross-sectional view of the signature area 20 illustrated in FIG. 3 during the signing process. When a signature tool 38, such as, for example a pen, pencil, stylus or other instrument, is used to sign on top of the stub 32, pressure is applied to the stub 32. The pressure is transferred through the stub 32 and material 34 to the signature pad 30, which may or may not cause small indents 40 in the signature pad 30. Regardless of whether or not indents 40 are made in the signature pad 30 (or body portion 12), the pressure from the signature tool 38 will cause the material 34 to transfer from the stub 32 to the signature pad 30 (or body portion 12). FIG. 4 illustrates the envelope 12 after the voter has provided his or her signature 50 in the signature area 20. Optionally, the envelope 10 could be pre-printed with an identification number on the signature stub 32 such that the identification number appears on the top surface of the signature stub 32 (illustrated by reference numeral 42 in FIG. 3) and is also transferred, via the material 34, to the signature pad 30 (or body portion 12). The identification numbers can be used by voters to determine if their vote was accepted or rejected for tallying as will be described below.

Figure 5:
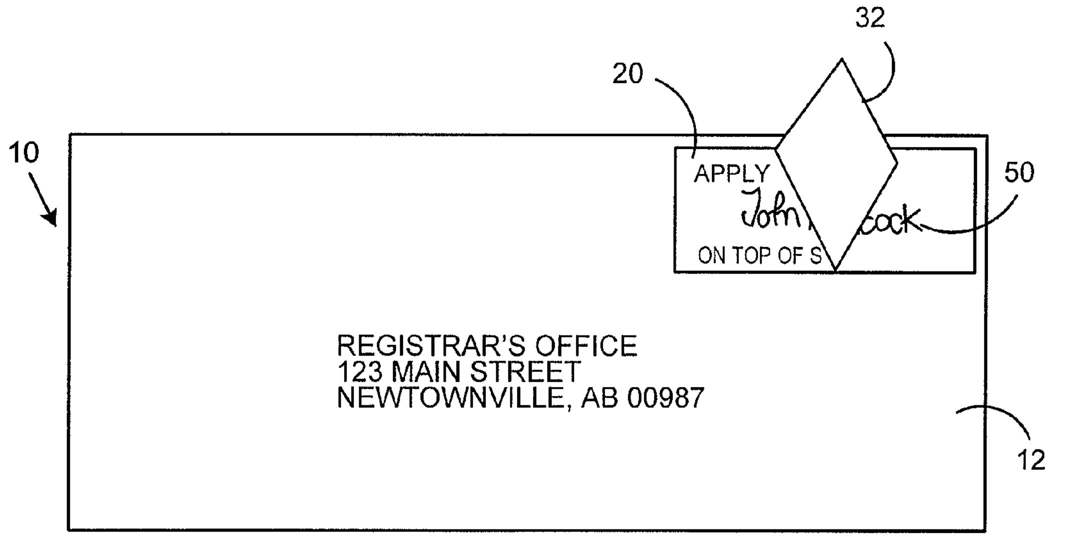
FIG. 5 illustrates the envelope of FIG. 1 during further processing by a voter for return of the ballot by mail.
Figure 6:
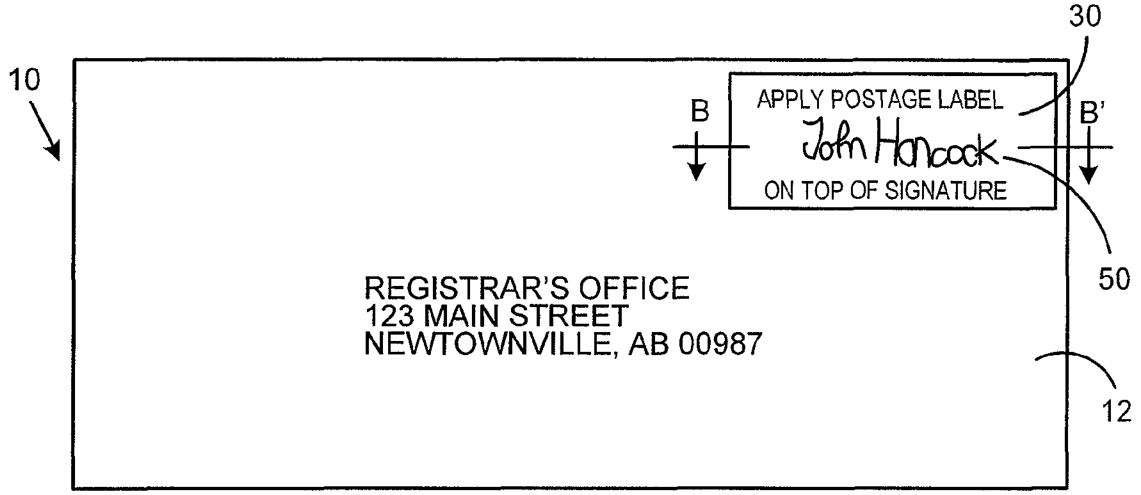
FIG. 6 illustrates the envelope of FIG. 1 during further processing by a voter for return of the ballot by mail.
Figure 7:
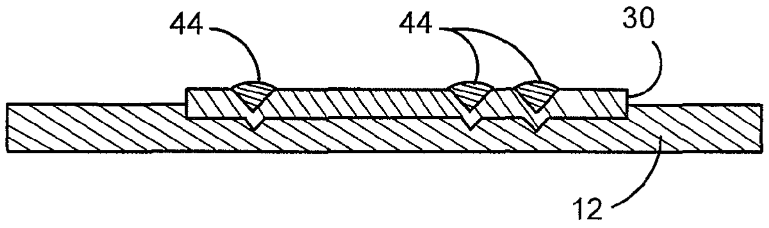
FIG. 7 illustrates a cross-sectional view of the envelope illustrated in FIG. 6 along line B-B' during further processing by a voter for return of the ballot by mail.

FIG. 5 illustrates the signature stub 32 being removed from the body portion 12 of envelope 10 after the voter has provided his or her signature in the signature area 20, and FIG. 6 illustrates the envelope 10 after the signature stub 32 has been removed. FIG. 7 illustrates a cross-sectional view of the envelope 10 illustrated in FIG. 6 along the line B-B'. As shown in FIG. 7, the material 34 has been transferred to the signature pad 30 in the areas, denoted by reference numeral 44, where the signature tool 38 exerted pressure to the stub 32 and where the identification number, if provided, was pre-printed. The use of the signature stub 32 and material 34 provides suitable control over the deposition on the signature pad 30 (or body portion 12) when the envelope 10 is signed. It is preferable that the material with which the signature is captured on the signature pad 30 (or body portion 12) be absorptive of light having wavelengths W to ensure sufficient contrast between the signature and the signature pad 30 (or body portion 12). For example, if the signature was signed with an ink that is partially reflective of light having wavelengths W, it will be difficult (if not impossible) to read the signature when illuminated by light of wavelengths W, since both the signature and the signature pad 30 (or body portion 12) will reflect the light. Using the signature stub 32 with the material 34 will ensure that regardless of the signature tool 38 used to sign the envelope 10, the substance deposited on the signature pad 30 (or body portion 12) will be controlled and be absorptive of light having the predetermined wavelengths W.

Figure 8:
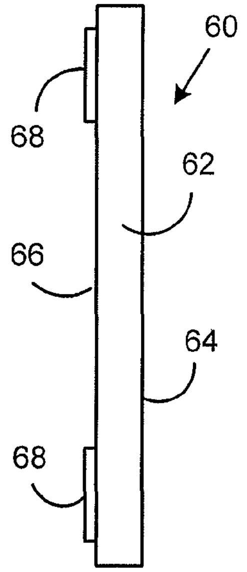
FIG. 8 illustrates a cross section of a label for concealing the voter's signature according to an embodiment of the invention.

Referring again to FIG. 6, the signature pad 30 (now visible as the signature stub 32 has been removed) can optionally include instructions for the voter indicating that the voter is to apply a label over the signature. The instructions, if provided, are preferably printed with a material that is transmissive to light having wavelengths W, but will contrast with the signature pad 30 under normal illumination. In this manner, the instructions can be read under normal white light but will be invisible when illuminated with light of wavelengths W. The label, described in more detail below, applied by the voter will conceal the voter's signature under normal white or ambient light conditions while allowing the signature to be viewed when the illuminated by light of the wavelengths W. FIG. 8 illustrates a cross section of a label 60 according to an embodiment of the invention. The label 60 includes a substrate 62 having a first surface 64 and a second surface 66. The substrate 62 is preferably made from a material that is transmissive to the one or more wavelengths W. The first surface 64 of the substrate 62 is the surface (side) of the substrate 62 that faces away from the envelope 10 while the second surface 66 of the substrate 62 is the surface (side) of the substrate 62 that faces towards the envelope 10 when the label 60 is affixed to the envelope 10. An adhesive 68 that is used to secure the label 60 to the body portion 12 of the envelope 10 may be disposed on the second surface 66 of the substrate 62. Optionally, a protective covering (not shown), which can be separated from the adhesive 68 thereby exposing the adhesive 68, may be disposed over the adhesive 68.

Figure 9:
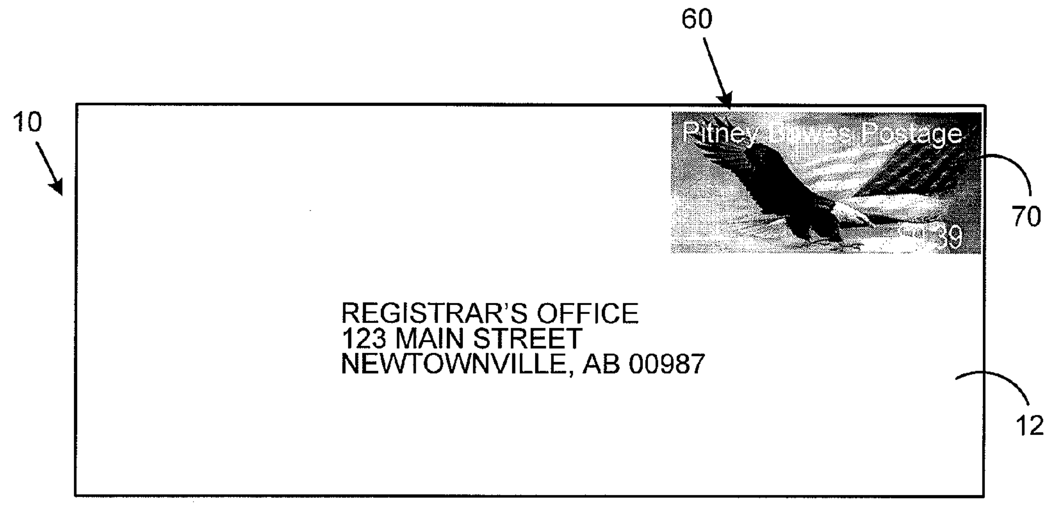
FIG. 9 illustrates a completed envelope when illuminated by white light.
Figure 10:
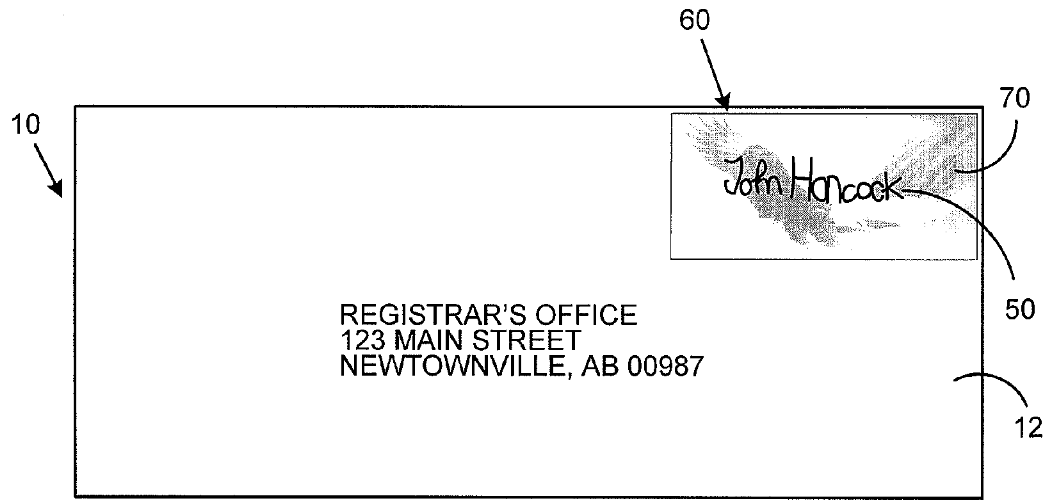
FIG. 10 illustrates the completed envelope of FIG. 9 when illuminated by light having the predetermined wavelength.

Printed on the first surface 64 of the substrate 62 is an image 70 that is used to conceal the voter's signature 50 as illustrated in FIG. 9. The image can include, for example, an indicium that evidences payment of postage for the envelope 10, or any other type of image desired. The image 70 may be printed onto substrate 62 using techniques that are commonly known in the art. For example, an ink jet printer may be used to print the image 70 onto the substrate 62. Alternatively, dye sublimation or thermal transfer may also be used to create the image 70 on the substrate 62. The image 70 is printed onto the first surface 64 of the substrate 62 using a dye or dyes that absorb or reflect wavelengths in the human visible light spectrum, e.g., in the range of approximately 400 to 700 nm, and are transmissive to light of wavelengths W. Accordingly, the image 70 would be clearly visible (to a human) when exposed to ambient or white light (light in the human visible light spectrum) and would thus conceal the voter's signature 50 as illustrated in FIG. 9. However, when illuminated by light of wavelengths W, the image 70 that is printed on the first surface 64 of the substrate 62 would appear substantially transparent. FIG. 10 depicts the envelope 10 when exposed to light of wavelengths W. Therefore, the voter's signature 50, formed of material that absorbs light of wavelengths W, can be viewed and/or read through the image 70 on label 60.

Figure 11:
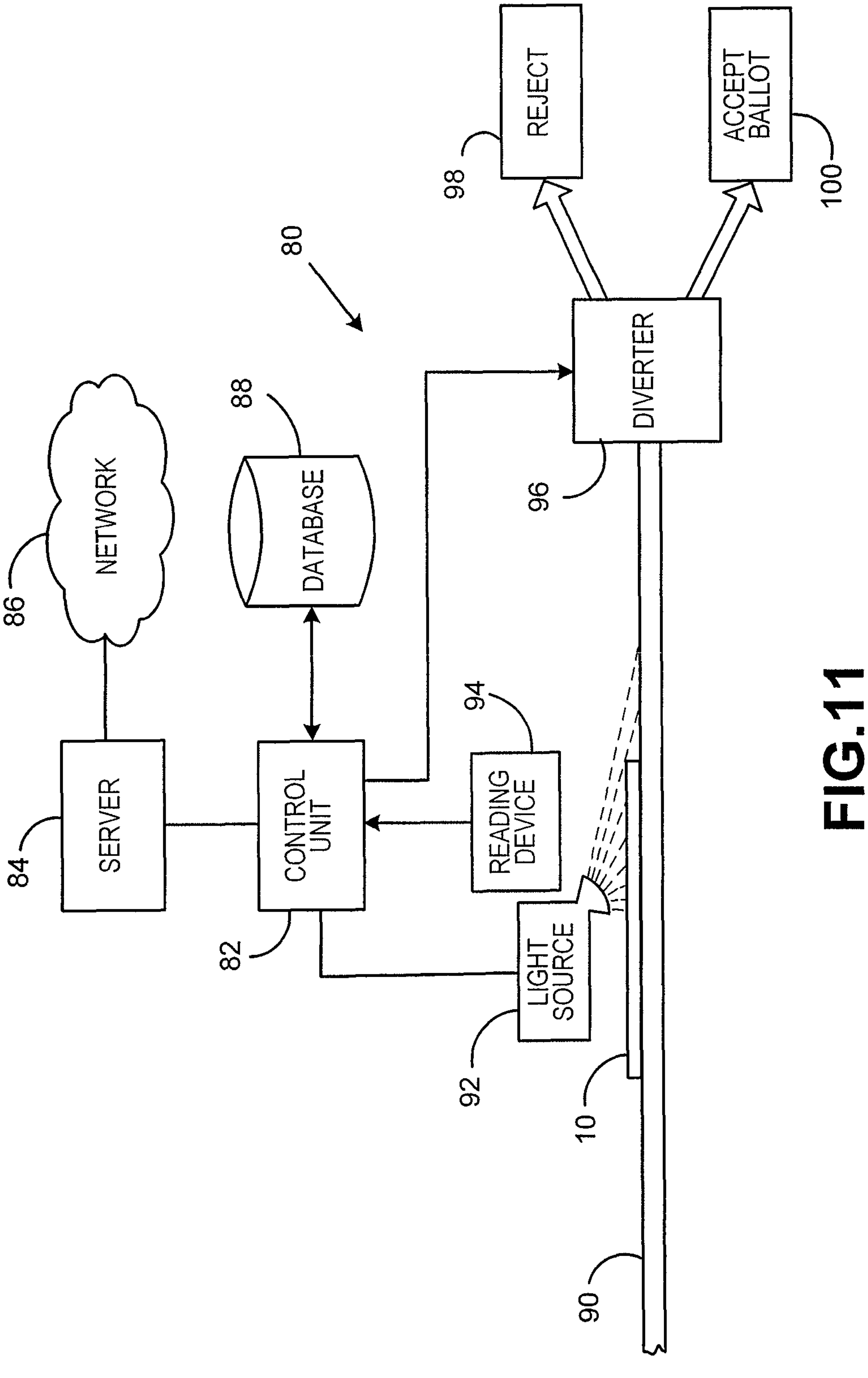
FIG. 11 illustrates in block diagram form a system for viewing the signature according to an embodiment of the present invention.

FIG. 11 illustrates in block diagram form an automated system 80 for viewing the signature concealed using the envelope 10 according to an embodiment of the present invention. System 80 includes a control unit 82, such as, for example, a general or special purpose microprocessor or the like, that controls operation of the system 80. Control unit 82 is connected to a database 88, which is used to store voter information, including, for example, name, address, and a reference signature for use in verifying ballots received by mail as described below. A transport 90, such as, for example, rollers and/or belts, is used to transport a series of envelopes 10 (only one shown in FIG. 11) through the system 80. A light source 92 is located adjacent to the transport to illuminate envelope 10 with light having the predetermined wavelengths W. A reading device 94, such as, for example, a scanner, camera, or the like is positioned adjacent to the light source 92 such that images of the envelopes 10 can be read while illuminated by the light source 92. Optionally, the light source 92 and reading device 94 can be located in some type of enclosure to limit the amount of outside light (white light) that will illuminate the envelope 10 during the reading process. Alternatively, the reading device 94 could utilize a lens that will capture only light having the wavelength W, thereby removing any interference from outside white light. A diverter 96 is located downstream from the reading device 94 and is coupled to the control unit 82. Based on command signals from the control unit 82, the diverter 96 will divert each envelope to a reject path 98 or an accept ballot path 100 as described below. The control unit 82 of the system 80 could optionally be coupled to a server 84. Server 84 can be coupled to a network 86, such as, for example, the Internet, through which information can be provided from the server 84 to remote locations.

Figure 12:
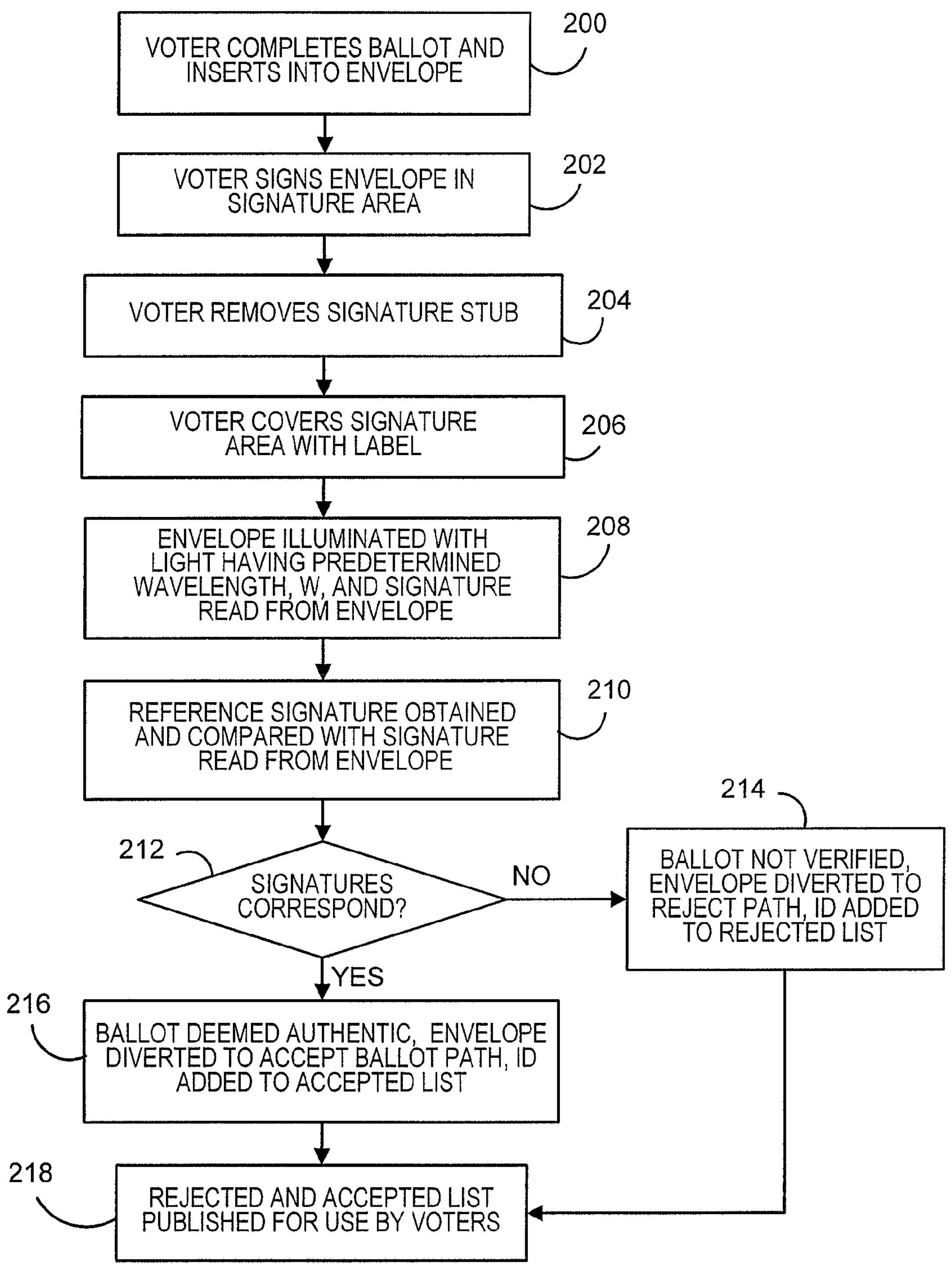
FIG. 12 illustrates in flow diagram form the preparation and processing of an envelope for mailing a ballot according to an embodiment of the present invention.

FIG. 12 illustrates in flow diagram form the preparation and processing of an envelope 10 for mailing a ballot. In step 200, a voter completes a ballot and inserts it into the pocket of envelope 10. In step 202, the voter signs the envelope 10 in the signature area 20, resulting in an envelope as illustrated in FIG. 4. In step 204, the voter removes the signature stub 32 from the signature area 20 (as illustrated in FIG. 5), resulting in the envelope 10 as illustrated in FIG. 6. In step 206, the voter covers the signature area 20 with a label 60 as described with respect to FIG. 8, thereby covering the voter's signature 50 (and possibly other information included in the identification area 22), and mails the envelope 10 to the registrar's office. The label 60 will conceal the voter's signature in the signature area 20 under normal, e.g., white light or ambient, illumination, as described above with respect to FIG. 9. Thus, the privacy of the voter's signature is maintained during transit of the envelope 10 from the voter to the registrar's office.

Upon receipt of the envelope 10 at the registrar's office, the envelope 10 can be processed using the system as illustrated in FIG. 11. In step 208, the envelope 10 is transported by the transport 90 and illuminated by the light source 92 with light having the predetermined wavelengths W. Illumination by light having the wavelengths W will result in the voter's signature being revealed as described above with respect to FIG. 10. The reading device 94 can then read the voter's signature in signature area 20 and the identification information from identification area 22 (regardless of where the information is printed on the envelope 10) from the envelope 10. If the envelope 10 was pre-printed with an identification number as described above, the identification number can also be read. In step 210, the control unit 82 can retrieve the reference signature from the database 88 (based on the identification information included on the envelope 10 for the voter) and compare the reference signature to the signature read from signature area 20 of envelope 10. In step 212, it is determined if the reference signature retrieved from the database 88 corresponds to the signature read from signature area 20 of envelope 10. If the signatures do not correspond, then in step 214 the ballot is rejected as not being verified and the envelope 10 is diverted by the diverter 96 to the reject path 98. If an identification number was also read from the envelope 10, then the control unit 82 can add the identification number of the envelope 10 to a reject list maintained by the server 84. Envelopes diverted to the reject path may be subject to some type of manual human inspection to make a final determination if the vote should be counted or not. If in step 212 it is determined that the signatures do correspond, then in step 216 the ballot is deemed to be authentic and verified and the envelope 10 is diverted by the diverter 96 to the accept ballot path 100, in which the ballot will be given to ballot counters for tabulation. If an identification number was also read from the envelope 10, then the control unit 82 can add the identification number of the envelope 10 to an accepted list maintained by the server 84. Preferably, the ballot is removed from the envelope 10 before being given to the ballot counters thereby maintaining a "secret ballot."

Optionally, if identification numbers were read from the envelopes 10 during processing, then in step 218 the server 84 can publish the reject and accepted lists, via the network 86, such that a voter can determine if his or her vote was accepted or rejected. Using the identification number printed on the signature stub 32 that was removed by the voter, as described with respect to step 204 before mailing the envelope 10, the voter can access the lists published by the server 84 and determine upon which list the identification number for his or her respective envelope 10 is located. Thus, each voter can easily confirm if his or her ballot was accepted or rejected during processing of the envelope 10.

It should be noted that the location and orientation of the signature area 20 need not be as shown and the signature area 20 can be located and oriented in any position on the envelope. For example, the signature area 20 could be located along the bottom edge of the envelope, or oriented vertically along a side edge of the envelope.

Thus, according to the present invention, methods and systems that protect the privacy of signatures on ballots sent through the mail are provided. Those skilled in the art will also recognize that various modifications can be made without departing from the spirit of the present invention. While preferred embodiments of the invention have been described and illustrated above, it should be understood that these are exemplary of the invention and are not to be considered as limiting. Additions, deletions, substitutions, and other modifications can be made without departing from the spirit or scope of the present invention. Accordingly, the invention is not to be considered as limited by the foregoing description but is only limited by the scope of the appended claims.

What is claimed is:

1. A method for processing an envelope for returning a ballot by mail, the method comprising:

providing a signature in a predefined area on a face of the envelope by signing a top surface of a signature stub attached to the face of the envelope to transfer material from a bottom surface of the signature stub to the predefined area on the face of the envelope, the material absorbing light outside of a human visible spectrum;

removing the signature stub from the envelope;

covering the signature with a label, the label including an image generated using one or more dyes that absorb or reflect light in the human visible spectrum and transmit light outside of the human visible spectrum, wherein the image will conceal the signature when illuminated by light in the human visible spectrum, and the image will be transparent such that the signature will be visible to a reading device when illuminated by light outside of the human visible spectrum.

2. The method of claim 1, wherein the image includes an indicium that evidences payment of postage for the envelope.

* * * * *